Patented Jan. 7, 1930

1,742,611

UNITED STATES PATENT OFFICE

GEORGE W. MILES, OF BOSTON, MASSACHUSETTS, AND CAMILLE DREYFUS, OF NEW YORK, N. Y., ASSIGNORS TO CELANESE CORPORATION OF AMERICA, A CORPORATION OF DELAWARE

CELLULOSE ESTERS AND THE MANUFACTURE THEREOF

No Drawing.  Application filed April 14, 1926. Serial No. 102,084.

It is well known that organic esters of cellulose are obtained by treating cellulose or its conversion or substitution products with anhydrides of acids, corresponding to the esters desired, in the presence of solvents or diluents and in the presence of condensing agents, catalyzers or contact materials.

Heretofore it has been impossible to manufacture cellulose organic esters without the use of anhydrides, except in the case of cellulose formate.

We have now found that it is not necessary to prepare the anhydrides of the acids for the manufacture of cellulose esters if the esterification is carried out under certain conditions. We have found that in using phosphoric acids as a medium of reaction, that cellulose combines with the organic acid to form an ester, even in the absence of the anhydride of the respective acid. The phosphoric acids in the presence of anhydrides or a mixture of organic acids and anhydrides can also be utilized as a medium of reaction for the manufacture of organic esters. The phosphoric acids can also be utilized as a medium of reaction for the manufacture of inorganic esters of cellulose. Cellulose acetates can be produced by mixing glacial acetic acid with cellulose in the presence of appropriate quantities of phosphoric acid ($H_3PO_4$ and/or $HPO_3$) in the absence of any acetic anhydride. The presence of metaphosphoric acid ($HPO_3$), or other phosporous derivatives, or similar acting materials, has a valuable influence on the facilitation of this reaction. There can be added to the reaction mixture contact materials, catalyzers or condensing agents; for instance, the presence of small quantities of sulphuric acid or other similar acting materials is sometimes very helpful in promoting the reaction. The reaction can be executed at a wide range of temperatures, but in order to obtain a high quality material, it is preferably executed at as low a temperature as possible. The best temperature to be chosen for execution of the reaction is dependent upon the ingredients present during the reaction; for instance in the presence of sulphuric acid, preferably a much lower temperature is used than in its absence and the same thing applies also, but not to the same extent, to the presence of metaphosphoric acid ($HPO_3$), or similar acting ingredients. The cellulose used for the purpose of the present reaction may be cotton, cotton linters, cellulose derived from wood, or cellulose of any other convenient form. It also includes the cellulose conversion products such as hydrates of cellulose, oxycelluloses and their derivatives, as long as any part of the hydrogen of the hydroxyl groups of the cellulose has not been replaced.

Embodied within the scope of the applicants' process is the manufacture of all cellulose esters according to this process, when any part of the hydrogen of the hydroxyl groups contained in the cellulose or its conversion products, etc. has been replaced by an organic or inorganic acid radical. By the term "organic acid radical" we mean, for the purpose of this invention, all acid radicals of the following configuration: $R-C=O$, where "R" stands for hydrogen or for an organic radical, be it aliphatic, aromatic, or mixed aliphatic or aromatic radical, or any organic or inorganic substitution derivative of such radicals. For example, H, $CH_3$, $CH_2$, Cl, $C_6H_5$, $C_6H_5CH_2$, etc. etc.

Cellulose or its conversion products can be subjected to a pretreatment before the reaction takes place in order to facilitate the reaction; for instance, it can be treated with a mixture of glacial acetic acid containing 2 or 3 or more per cent of sulphuric acid, and for a period long enough to bring the material to the desired reactivity. Also a pretreatment with phosphoric acid ($H_3PO_4$), of 70 to 85% strength, in the presence or in the absence of a small percentage of sulphuric acid, or any other suitable methods of pretreatment, can be used.

This invention comprises the cellulose esters, whether they are formed in solution or in suspension and whether the esterification is performed in one or more stages. For certain purposes, it is possible to conduct the reaction so that the cellulose esters are in solution in the reaction mixture. In this case the resulting solution can be used for certain purposes as such, or it may be used only after addition of certain ingredients to neutralize the effect of certain constituents of the reaction mixture. For instance, if sulphuric acid was present before or during the reaction, it may be advantageous to neutralize the sulphuric acid, for certain purposes, with alkalis or salts, like sodium acetate, etc. Solutions, such as the above, can be used for the manufacture of films, artificial silks, etc. etc., before or after neutralization, or if desired, the esters can be precipitated by the introduction of water or similar acting fluids at any desired stage of the reaction, and the precipitates so obtained can be washed, dried or treated in any other way, dependent upon the use to which the ester is to be put. The filtrate containing the remaining products and ingredients of the reaction mixture, such as acids, etc., can be treated in any suitable way for the recovery of any valuable constituents.

In some cases it is possible to carry out the reaction advantageously in such a way that the cellulose ester formed does not go into the solution during the reaction. This can be achieved by the addition, either before or during the reaction, of precipitating agents for the cellulose ester to the reaction mixture (like benzol, etc.). Precipitating agents which have no influence on or are neutral to the other ingredients necessary to carry out the reaction should preferably be employed. The suspension can also be achieved when the ingredients are mixed in such a way that the esters of cellulose formed do not go into solution; for instance, in the case of cellulose acetate, when it is the intention to produce cellulose acetate which is insoluble in glacial acetic acid, the addition of an excessive amount of glacial acetic acid to the reaction mixture has the desired effect. It is advantageous to choose a precipitating agent from among the ingredients which take part in the reaction, when it is desired to work in suspension.

The present invention also embraces the esterification of articles or fabrics when they contain cellulose or its derivatives, etc. in any form, in which case the esterification is performed in suspension. For instance, a fabric containing cellulose can be passed through a reaction mixture suitable for producing esterification of all or part of the cellulose of the fabric without appreciably changing the appearance, etc. of this fabric. The properties and the qualities of the fabric, however, will be considerably altered. Cotton fabric so treated and containing from 10% to 30% or more of combined acetic acid is a very valuable fabric, since among other advantages, it will not rot when exposed to the action of sea-water, whereas the original untreated fabric will rot when so exposed. Also wood and paper articles can be treated in the same fashion with similar advantages resulting.

The esters obtained by the applicants' process can be utilized as such or if desired can be "ripened" or "hydrated" in order to change their solubilities and improve their qualities. This ripening can be carried out on the ester when it is still in solution in the reaction mixture or after it has been precipitated and removed therefrom. Where the ester has been produced in suspension, the ripening process can be carried out either before or after the ester has been separated from the reaction mixture.

Any well known and suitable process of ripening can be employed in treating the esters obtained by the applicants' process. Care must be exercised in choosing the particular reagent and temperature to be utilized in ripening the various esters. The duration of the ripening process is also extremely important.

The cellulose esters produced by any of the methods heretofore or hereinafter indicated can be used, among other things, for the production of artificial silk, varnishes, enamels and solutions of all kinds and for the production of plastic masses, photographic and cinematographic films, for moulding articles, and in general for any application where nitrate of cellulose or other esters of cellulose are used or can be used. These esters can be used with or without the addition of gelatinizers, swelling or softening agents, camphor substitutes, high boiling point solvents, etc. etc.

In order to illustrate the present invention we cite the following examples:

1. 20 grams of linters were treated with 30 ccs. of glacial acetic acid and allowed to stand for 24 hours. Then there were added 70 ccs. of a mixture containing 70 ccs. of phosphoric acid ($H_3PO_4$), (sp. gr. 1.85), 30 ccs. glacial acetic acid, and left for 24 hours at 80°–100° F. Then there were added 10 grams of metaphosphoric acid ($HPO_3$), 30 ccs. of the above 70–30 mixture and 20 ccs. of glacial acetic acid. After standing for 24 hours this was precipitated, washed and dried, and it showed on analysis 56.5% combined acetic acid.

In the above example approximately 2% of sulphuric acid may be added to the glacial acetic acid first added in order to hasten the acetylation of the cellulose.

2. 20 grams of linters were treated with 30 ccs. of glacial acetic acid for 24 hours. Then there were added 100 ccs. of the above 70–30 mixture and left 24 hours at 100°–120° F. This sample, separated and washed, showed 44½% combined acetic acid.

3. 5 grams of linters plus 50 ccs. of 90% phosphoric acid ($H_3PO_4$) were allowed to stand 15 minutes. To this there were added 50 ccs. glacial acetic acid and allowed to stand 50 hours in the cold, and subsequently at 85° to 100° F., for approximately 70 hours. A clear solution resulted. Precipitated with water and washed. The product showed 30% of combined acetic acid, and was soluble in acetic acid, and gave a film of excellent strength.

4. 5 grams of linters, plus 20 ccs. of 95% phosphoric acid ($H_3PO_4$), plus 10 ccs. glacial acetic acid, were mixed and left for 15 hours at 70°–85° F. Then there were added 10 ccs. glacial acetic acid, plus ¾ cc. of concentrated sulphuric acid, and allowed to stand for approximately 10 hours. No $HPO_3$ or $P_2O_5$ was added. The product showed 42% of combined acetic acid.

5. 5 grams of linters, plus 30 ccs. of 95% phosphoric acid ($H_3PO_4$), plus 20 ccs. of glacial acetic acid, and ¾ cc. of concentrated sulphuric acid, plus 5 grams powdered $HPO_3$ were added together and left on a bath at 95° F. for 24 hours. The product obtained showed 45½% of combined acetic acid after precipitation and washing.

6. 5 grams of linters, plus 20 ccs. of benzol were put on a bath at 100° C. for 15 minutes. To this was added 15 ccs. of the above 70–30 mixture. After four or five days 55 ccs. of glacial acetic acid, plus 5 grams of $HPO_3$ were added and the whole left 15 hours at 125° F. Then there were added ½ cc. of sulphuric acid and left at room temperature for 24 hours. This product showed 36.7% combined acetic acid. Allowed to stand another 24 hours at room temperature the product then showed 42.3% combined acetic acid.

7. 5 grams of linters, plus 20 ccs. of 85% $H_3PO_4$, plus 15 ccs. of glacial acetic acid were left on a bath at 125° F. for 24 hours. Then there were added 25 ccs. of glacial acetic acid plus 10 grams $HPO_3$ and left at 125° F. for another 24 hours. The product had 21% of combined acetic acid and was fibrous in character.

8. 20 grams of linters, plus 30 ccs. of 90% formic acid, were left on a bath at 112° F. for six hours. Then there were added 30 ccs. of 100% formic acid and 70 ccs. $H_3PO_4$ (sp. gr. 1.85), and allowed to stand 24 hours at 112° F. Then there were added 30 grams $HPO_3$ and after several hours there were added 25 ccs. more of 100% formic acid. Left 24 hours. Precipitated and washed. The product showed 28.7% combined formic acid.

9. Two lots of linters of 3 grams each, containing 25 ccs. of $H_3PO_4$ (sp. gr. 1.85), plus 25 ccs. of 100% formic acid, were allowed to stand three hours and to these were then added 5 grams of $HPO_3$. Left 24 hours at 100° to 125° F. Both solutions were clear, like honey. One product showed 10.8% of combined formic acid, when separated and washed. The other one was cooled to room temperature and ½ cc. of sulphuric acid was added, and left for 24 hours. This product contained 21.6% of combined formic acid.

10. 5 grams of cotton linters were mixed with 100 ccs. of 100% formic acid, plus 10 grams $HPO_3$ and allowed to stand in a closed container for 40 hours on a bath at 100° F. Then an additional 10 grams of $HPO_3$ were added and the mixture allowed to stand for approximately 50 hours at the same temperature. A product was obtained containing 15.15% of combined formic acid.

11. 20 grams of linters with 70 ccs. of $H_3PO_4$ (sp. gr. 1.85), plus 30 ccs. of glacial acetic acid were left for about one hour at approximately 100° F. Then there were added 20 grams of powdered $HPO_3$, plus 70 ccs. of glacial acetic acid. This was heated to 100°–125° F. for 24 hours with occasional stirring. Then there were added 2 ccs. of sulphuric acid at room temperature and left for another 24 hours in the cold. Precipitated and washed and dried. The product contained 55% of combined acetic acid and was soluble in glacial acetic acid.

12. The ester was prepared as in the preceding example (11) and the solution was allowed to stand, approximately at freezing temperature, for 15 hours. A large proportion of the phosphoric acid crystallized out. The crystals were removed from the mixture and to the clear liquid was added 100 ccs. of water, at approximately 40° F. After standing 3 hours a sample was taken out and precipitated and washed. This was soluble in glacial acetic acid and also in 99% acetone. A portion allowed to stand 5 hours at 35° F. was no longer soluble in glacial acetic acid or in 99% acetone, dissolving in these liquids only after they were diluted with a little water. This showed that the hydration or ripening had been carried on beyond the point of solubility in 99% acetone.

13. To 5 grams of linters in a glass stoppered bottles were added 40 ccs. of the above 70–30 (phosphoric-acetic-acid) mixture and allowed to stand for about 24 hours at room temperature. To this mass there were added 20 ccs. of glacial acetic acid, plus 8 grams of $HPO_3$ and kept for three hours at approximately 120° F. Further allowed to stand for about 10 hours at approximately 90° F. Then kept 6 hours at approximately 120° F. Precipitated and washed, when the product contained 51.5% of combined acetic acid.

14. 5 grams of cotton linters were mixed with 100 ccs. of glacial acetic acid, plus 5 grams of HPO₃ in a closed container, and left during approximately 10 hours at approximately 125° F. Then another 5 grams of HPO₃ were added and allowed to stand at above temperature for another 24 hours. Then another 10 grams of HPO₃ were added and the whole allowed to stand for approximately 50 hours at above temperature, separated and washed, obtaining a product which showed 21.46% combined acetic acid.

These examples are only illustrative and not limitative. The quantities can be varied within a wide range as can also the temperatures and the duration of the reaction. Where desired the orthophosphoric acid can be entirely replaced by metaphosphoric acid in suitable quantities. The reaction can take place in the presence of additional ingredients, especially ingredients which have the property of extracting or absorbing water formed during the reaction or otherwise; for instance, other phosphorous derivatives having these qualities, or small quantities of sulphuric acid, etc. etc. Instead of glacial acetic or formic acid, other acids containing a carboxyl group can be used, such as propionic acid, butyric acid, lactic acid, oleic acid, palmitic acid, stearic acid, cocoanut acid, benzoic acid or derivatives or subsitution products of these acids with the result that the corresponding cellulose esters are obtained; for instance in using butyric acid, butyric esters of cellulose are obtained. Also mixed acids can be used, in which case mixed esters of cellulose are obtained. Where desired, inorganic acids, such as nitric acid, etc. can be used to obtain inorganic esters of cellulose, such as nitrocellulose, etc.

By phosphoric acid as used in the claims, we include the ortho and meta or any suitable phosphoric acids, or mixtures of these acids. And in a similar manner we consider all inorganic acids and their suitable derivatives, with the exception of phosphoric acid, which is only used as a reaction medium, within the scope of our invention.

The acetates, formates and esters obtained according to the present invention differ in some qualities from the similar esters of cellulose made according to the old methods and are therefore considered as new products. Also the various pretreatment processes and different methods of ripening, as well as the products obtained therefrom, are to be considered as within the scope of the invention and claims.

What we claim and desire to secure by Letters Patent is:

1. A process of manufacturing organic esters of cellulose which comprises the steps of pretreating cellulosic material with a mixture of phosphoric acid and an organic acid and subsequently esterifying the pretreated cellulosic material by treating the same with a mixture of an organic acid corresponding to the ester desired and a phosphoric acid, the amount of the organic acid present during the esterification step being substantially larger than that present during the pretreating step.

2. A process of manufacturing organic esters of cellulose which comprises the steps of pretreating cellulosic material with a mixture of a phosphoric acid, an organic acid and a small amount of sulfuric acid, and subsequently esterifying the pretreated cellulosic material by treating the same with a mixture of an organic acid corresponding to the ester desired and a phosphoric acid, the amount of the organic acid present during the esterification step being substantially larger than that present during the pretreating step.

3. A process of preparing cellulose acetate which comprises the steps of pretreating cellulosic material with a mixture of a phosphoric acid and glacial acetic acid and subsequently acetylating the pretreated material by adding to the same a further substantial quantity of glacial acetic acid.

4. A process of esterifying cellulose which comprises pretreating cellulosic material with a mixture of orthophosphoric acid and an acid corresponding to the ester desired, warming and allowing to stand and subsequently adding to the pretreated cellulosic material a mixture of the acid of the ester desired and metaphosphoric acid.

5. A process of making cellulose acetate which comprises pretreating cellulosic material with a mixture of phosphoric acid and acetic acid, subsequently treating the pretreated material with a mixture of glacial acetic acid and phosphoric acid and small amounts of sulphuric acid.

6. A process of acetylizing cellulose which comprises treating 5 grams of cotton linters with 20 to 50 ccs. of glacial acetic acid and 20 to 40 ccs. of orthophosphoric acid and warming the mixture for several hours.

7. A process of acetylizing cellulose which comprises treating 5 grams of cotton linters with 25 ccs. glacial acetic acid, 20 ccs. of orthophosphoric acid, and 5 grams of metaphosphoric acid, warming the mixture while allowing to stand for several hours.

8. A process of acetylizing cellulose which comprises treating 5 grams of cotton linters with 25 ccs, glacial acetic acid, 20 ccs. of orthophosphoric acid, 5 grams of metaphosphoric acid and ¼ to 3 ccs. sulphuric acid, warming the mixture while allowing to stand for several hours.

9. A process of acetylizing cellulose which comprises pretreating 5 grams of cotton linters with 25 ccs. of a 7-3 orthophosphoric-glacial acetic acid mixture, warming slightly and allowing to stand for about one hour then adding to the reaction mixture 5 grams of metaphosphoric acid, 20 ccs. of glacial acetic acid and two ccs. of concentrated sulphuric acid and allowing to stand for 24 hours.

10. Cellulose acetates prepared in the presence of phosphoric and acetic acid which contain approximately 20 to 56% of combined acetic acid and which are soluble in glacial acetic acid and acetone.

In testimony whereof, we have hereunto subscribed our names.

GEORGE W. MILES.
CAMILLE DREYFUS.